United States Patent
Huang et al.

(10) Patent No.: US 11,532,176 B2
(45) Date of Patent: Dec. 20, 2022

(54) MODULE STRUCTURE

(71) Applicant: SHANGHAI HARVEST INTELLIGENCE TECHNOLOGY CO., LTD., Shanghai (CN)

(72) Inventors: Jiandong Huang, Shanghai (CN); Fengjun Gu, Shanghai (CN)

(73) Assignee: SHANGHAI HARVEST INTELLIGENCE TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 17/363,757

(22) Filed: Jun. 30, 2021

(65) Prior Publication Data

US 2022/0036033 A1    Feb. 3, 2022

(30) Foreign Application Priority Data

Jun. 30, 2020   (CN) .......................... 202021249401.8

(51) Int. Cl.
  *G06V 40/13* (2022.01)
  *H05K 5/00* (2006.01)
(52) U.S. Cl.
  CPC ....... *G06V 40/1318* (2022.01); *H05K 5/0017* (2013.01)

(58) Field of Classification Search
  CPC .......................... G06V 40/1318; H05K 5/0017
  See application file for complete search history.

(56) References Cited

U.S. PATENT DOCUMENTS

2018/0321780 A1* 11/2018 Park ................... G06V 40/1306

* cited by examiner

*Primary Examiner* — Premal R Patel
(74) *Attorney, Agent, or Firm* — Thomas | Horstemeyer, LLP

(57) ABSTRACT

The present disclosure provides a module structure, including: a middle frame having a first surface, wherein a groove is disposed in the middle frame and has an opening on the first surface; a sensing module, wherein at least a partial of the sensing module is disposed in the groove; a display unit, disposed on the first surface of the middle frame and the sensing module; a first dielectric layer disposed between the sensing module and the display unit; a second dielectric layer disposed between the sensing module and a bottom of the groove; and a third dielectric layer disposed between the first surface of the middle frame and the display unit. With the first dielectric layer, when any one of the sensing module or the display unit is damaged in a testing process, the other one can be recovered, thereby reducing the cost and loss.

25 Claims, 3 Drawing Sheets

MODULE STRUCTURE

CROSS-REFERENCE TO RELATED APPLICATIONS

This application claims the benefit of priority to Chinese Patent Application No. 202021249401.8, filed on Jun. 30, 2020, entitled "Module Structure," the entire content and disclosure of which is incorporated herein by reference.

TECHNICAL FIELD

The present disclosure relates to the field of fingerprint identification device, and more particularly to a module structure.

BACKGROUND

During development and production of electronic devices, a series of performance tests are required. For under-screen fingerprint identification equipment, a sensing module and a display unit are attached together to form a module structure, and the module structure requires various mechanical, electrical, optical and other tests.

During test of the module structure, the sensor module or the display unit are easy to be damaged. As long as one of the sensing module and the display screen is damaged, the entire module structure is discarded as useless. Thus, the module structure has a large loss cost during the test.

SUMMARY

Embodiments of the present disclose provides a module structure to solve a problem of decoupling between the sensing module and the display unit.

An embodiment of the present disclosure provides a module structure. The module structure includes: a middle frame having a first surface, wherein a groove is disposed in the middle frame and has an opening on the first surface; a sensing module, wherein at least a partial of the sensing module is disposed in the groove; a display unit, disposed on the first surface of the middle frame and the sensing module; a first dielectric layer disposed between the sensing module and the display unit; a second dielectric layer disposed between the sensing module and a bottom of the groove; and a third dielectric layer disposed between the first surface of the middle frame and the display unit.

In some embodiments, the sensing module and the display unit are detachably connected via the first dielectric layer.

In some embodiments, the first dielectric layer is configured to realize a quasi-fixed connection between the sensing module and the display unit under a first preset treatment, and the first dielectric layer is further configured to realize separation of the sensing module from the display unit under a second preset treatment.

In some embodiments, the first preset treatment includes at least one of temperature treatment, light treatment and solvent treatment, and the second preset treatment includes at least one of temperature treatment, light treatment, and solvent treatment.

In some embodiments, the second preset treatment is configured to make a strength of a connection between the first dielectric layer and the sensing module greater than a strength of a connection between the first dielectric layer and the sensing module.

In some embodiments, the first dielectric layer is made of a material including at least one of a solid adhesive and a liquid adhesive.

In some embodiments, along a thickness direction of the module structure, a side of the second dielectric layer is in contact with the sensing module, and another side of the second dielectric layer is in contact with the bottom of the groove, and the second dielectric layer is made of a deformable material.

In some embodiments, the third dielectric layer is made of a deformable material, and a thickness of the third dielectric layer is smaller than a thickness of the second dielectric layer.

In some embodiments, the display unit and the middle frame are detachably connected via the third dielectric layer.

In some embodiments, the first dielectric layer is further configured to realize a fixed connection between the sensing module and the display unit under a strengthening treatment.

In some embodiments, the strengthening treatment includes at least one of temperature treatment, light treatment and solvent treatment.

In some embodiments, the sensing module has an upper surface facing the display unit, a lower surface opposite to the upper surface and a side wall perpendicular to the upper surface, and the module structure further includes a strengthening layer disposed on at least a part of the side wall of the sensing module and extending to the display unit to realize a fixed connection between the sensing module and the display unit.

In some embodiments, the module structure further includes: a light shielding layer covering a part of or all of a circumferential length of the side wall of the sensing module along a circumferential direction of the side wall of the sensing module.

In some embodiments, the strengthening layer covers a circumferential length of the side wall of the sensing module along a circumferential direction of the side wall of the sensing module.

In some embodiments, the strengthening layer is made of a light-absorbing material.

In some embodiments, the first dielectric layer is made of fluid, and the module structure further includes: a fourth dielectric layer at least surrounding the sensing module, wherein the fourth dielectric layer forms a cavity between the sensing module and the display unit to accommodate the first dielectric layer; a fixing support disposed between the sensing module and the bottom of the groove, wherein the sensing module is fixed on the fixing support; and a fifth dielectric layer disposed between the fixing support and the sensing module, wherein the sensing module and the fixing support are fixedly connected via the fifth dielectric layer.

In some embodiments, a viscosity coefficient of a material of the first dielectric layer is greater than or equal to a viscosity coefficient of silicone oil; or the first dielectric layer is made of silicone oil.

In some embodiments, along a thickness direction of the module structure, a side of the fourth dielectric layer is in contact with the display unit and another side of the fourth dielectric layer is in contact with the fixing support, and the fourth dielectric layer is made of a deformable material and configured to realize separation of the display unit from the fixing support.

In some embodiments, the third dielectric layer is made of a deformable material; wherein the second dielectric layer is disposed between the fixing support and the bottom of the groove, and in a thickness direction of the module structure, a side of the second dielectric layer is in contact with the bottom of the groove and another side of the second dielectric layer is in contact with the fixing support, and the second dielectric layer is a made of a deformable material; and wherein in the thickness direction of the module structure, a sum of a dimension of the fourth dielectric layer and a dimension of the second dielectric layer is larger than a dimension of the third dielectric layer.

In some embodiments, the module structure further includes: an adjusting member configured for adjusting a distance between the fixing support and the display unit.

In some embodiments, the middle frame has a second surface opposite to the first surface, and the groove penetrates through a partial thickness of the middle frame; wherein a part of the adjusting member penetrates through at least a partial of a remaining thickness of the middle frame, an end of the adjusting member is exposed on the second surface of the middle frame, and another end of the adjusting member contacts the fixing support; and wherein a position of the fixing support in the groove of the middle frame can be adjusted via the end of the adjusting member exposed on the second surface of the middle frame.

In some embodiments, the fourth dielectric layer is made of rubber; the fifth dielectric layer is made of double-sided foam adhesive; the second dielectric layer is made of double-sided foam adhesive; and/or the third dielectric layer is made of an adhesive and easy-to-clean material.

In some embodiments, the sensing module is an optical fingerprint sensing module, and a light transmittance of a material of the first dielectric layer is greater than a preset value.

In some embodiments, there are no bubbles in the first dielectric layer.

In some embodiments, the display unit is made of a rigid or flexible material.

Compared with conventional technologies, embodiments of the present disclosure have following beneficial effects.

According to some embodiment, the module structure includes a middle frame, a sensing module, a display unit, a first dielectric layer filled between the sensing module and the display unit, a second dielectric layer disposed between the sensing module and a bottom of the groove, and a third dielectric layer disposed between the first surface of the middle frame and the display unit, thus a direct squeezing between the display unit and the sensing module due to their direct physical contact can be avoided, pressure between the display unit and the sensing module can be reduced, and a reliability of the sensing module and the display unit can be improved.

According to some embodiment, the first dielectric layer is detachably connected to at least one of the sensing module and the display unit. Therefore, in the test process, when any one of the sensing module and the display unit is damaged, the sensing module and the display unit can be separated to recycle the other one of the sensing module and the display unit that is not damaged, which effectively reduces the dependence of the sensing module on the display unit, and effectively reduces the cost loss of the module.

According to some embodiment, the first dielectric layer can be cured by a first preset treatment to achieve a quasi-fixed connection between the sensing module and the display unit, so that a relative position between the display unit and the sensing module is fixed, which can effectively ensure the quality of fingerprint image captured by the sensing module and displayed image of the display unit.

According to some embodiment, the first dielectric layer is also suitable for realizing a fixed connection between the sensing module and the display unit under the strengthening treatment, or the module structure further includes a strengthening layer for realizing the fixed connection between the sensing module and the display unit, thereby improving the reliability and stability of the module structure under operation conditions.

According to some embodiment, the sensing module is an optical fingerprint sensing module, and the connection between the first dielectric layer and the sensing module and the connection between the first dielectric layer and the display unit are all configured to be detachable, which can effectively reduce an internal stress of the module structure, and can effectively reduce the possibility of excessive stress which affects the functions of the sensing module and the display unit.

According to some embodiment, the second dielectric layer and the third dielectric layer are both made of deformable materials. When a side of the second dielectric layer is in contact with the sensing module, another side is in contact with the bottom of the groove. Moreover, a thickness of the second dielectric layer is greater than a thickness of the third dielectric layer, so as to ensure that a deformation range of the second dielectric layer is greater than a deformation range of the third dielectric layer, which can effectively avoid direct squeezing between the display unit and the sensing module due to their direct physical contact, reduce pressure between the display unit and the sensing module, and further improving the reliability of the sensing module and the display unit.

DETAILED DESCRIPTION

As mentioned in the background, the module structure has the problem of high loss cost, and reasons of the high loss cost are analyzed by combining with a bonding mode of the module structure in the conventional technology.

In the conventional technology, the sensing module is fixedly attached to the display unit, that is, the sensing module is fixedly connected with the display unit. Once the connection is completed, the sensing module and the display unit cannot be separated. If any one of the sensing module and the display module is damaged, even if the other is not damaged, the whole module structure is still scrapped, which leads to the problem of excessive loss cost of module structure in the test process.

Moreover, when the sensing module is an optical fingerprint identification module, after the sensing module and the display unit are fixed and bonded, large stress may be generated in the module structure due to the fixed and bonded process, and the excessive stress may affect the functions of the optical fingerprint sensing module and the display unit. For example, the obtained fingerprint image or the displayed image may have problems such as shadow.

In order to resolve above problem, the present disclosure provides a module structure. The module structure includes: a middle frame having a first surface, wherein a groove is disposed in the first surface; a sensing module at least partially disposed in the groove; a display unit covering the first surface of the middle frame and the sensing module; a first dielectric layer filled between the sensing module and the display unit; a second dielectric layer disposed between the sensing module and a bottom of the groove; and a third dielectric layer disposed between the first surface of the middle frame and the display unit.

According to some embodiment, the module structure includes a middle frame, a sensing module, a display unit, a first dielectric layer filled between the sensing module and the display unit, a second dielectric layer disposed between the sensing module and a bottom of the groove, and a third dielectric layer disposed between the first surface of the middle frame and the display unit, thus a direct squeezing between the display unit and the sensing module can be avoided, and a reliability of the sensing module and the display unit can be improved.

In order to make above objectives, features and advantages of the present disclosure more obvious and understandable, specific embodiments of the present disclosure will be described in detail below with reference to the accompanying drawings.

Figure 1:
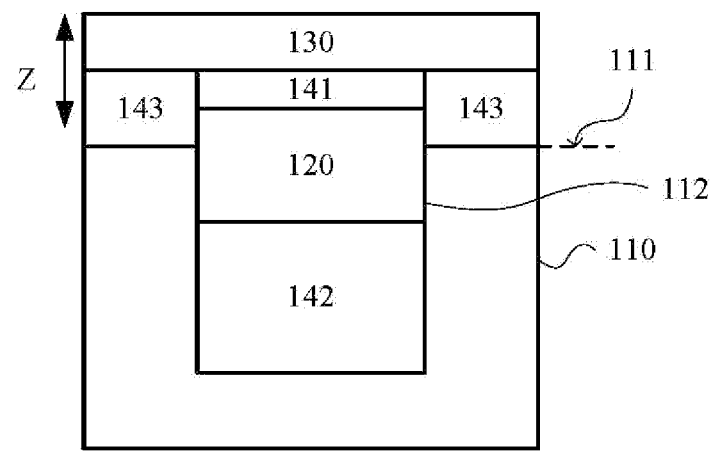
FIG. 1 is a schematic view showing a cross-sectional structure of a module structure according to a first embodiment of the present disclosure.

FIG. 1 is a schematic view showing a cross-sectional structure of a module structure according to a first embodiment of the present disclosure.

As shown in FIG. 1, the module structure includes a middle frame 110, a sensing module 120, a display unit 130, a first dielectric layer 141, a second dielectric layer 142 and a third dielectric layer 143. The middle frame 110 has a first surface 111, and a groove 112 is disposed in the middle frame 110 and has an opening on the first surface 111. At least a partial of the sensing module 120 is disposed in the groove 112. The display unit 130 covers the first surface 111 of the middle frame 110 and the sensing module 120. The first dielectric layer 141 is filled a space between the sensing module 120 and the display unit 130. The second dielectric layer 142 is disposed between the sensing module 120 and a bottom of the groove 112. The third dielectric layer 143 is disposed between the first surface of the middle frame 110 and the display unit 130.

With the arrangement of the middle frame 110, the sensing module 120, the display unit 130, the first dielectric layer 141, the second dielectric layer 142 and the third dielectric layer 143, a direct squeezing between the display unit 130 and the sensing module 120 can be avoided, and a reliability of the sensing module 120 and the display unit 130 can be improved.

In some embodiments, the first dielectric layer 141 is configured to realize a detachable connection between the sensing module 120 and the display unit 130. In some embodiments, the third dielectric layer 143 is configured to realize a detachable connection between the display unit 130 and the middle frame 110.

In some embodiments, the first dielectric layer 141 is detachably connected to the sensing module 120 and the display unit 130. Therefore, during the testing process, when any one of the sensing module 120 or the display unit 130 is damaged, the sensing module 120 and the display unit 130 can be separated to recover the other one, thereby effectively reducing the cost of the device.

The first embodiment of the present disclosure will be described in detail below with reference to the drawings.

The middle frame 110 constitutes a housing of the module structure, so as to hold the module structure and provide necessary mechanical support for the module structure. In some embodiments, the middle frame is made of metal. In other embodiments of the present disclosure, the middle frame may also be made of other suitable materials such as hard plastic.

In some embodiments, the middle frame is concave. The middle frame 110 has a first surface 111 (indicated by a dashed line and its extension line in the figure), and the groove (not shown in the figure) is disposed in the first surface 111 of the middle frame 110. The groove is suitable for providing space for setting electronic components for testing.

The sensing module 120 is configured to obtain images of biometric feature, and the biometric features may be fingerprints, palm prints, and the like. In some embodiments, the sensing module 120 is a fingerprint sensing module. Specifically, the sensing module 120 is an optical fingerprint sensor module, that is, the sensing module 120 is a fingerprint sensing module based on optical principle, so the sensing module 120 receives light carrying fingerprint information to obtain a fingerprint image.

As shown in FIG. 1, the sensing module 120 is partially disposed in the groove. In other embodiments of the present disclosure, the sensing module 120 may also be all located in the groove.

The display unit 130 configured to display static or dynamic images. The display unit 130 covers the first surface 111 of the middle frame 110 to form the module structure.

In some embodiments, the display unit 130 is a rigid display unit, that is, the display unit has a rigid substrate. Specifically, the substrate of the display unit is rigid glass. In other embodiments of the present disclosure, the substrate of the display unit may also be other rigid materials such as semiconductor substrates, for example, silicon and germanium.

It should be noted that in other embodiments of the present disclosure, the display unit may also be a flexible display unit, that is, the substrate of the display unit is a flexible material, such as a polyimide (PI) film.

The first dielectric layer 141 is filled between the sensing module 120 and the display unit 130. The first dielectric layer 141 is configured to realize a detachable connection between the sensing module and the display unit, that is, a connection between a surface of the first dielectric layer 141 facing the sensing module 120 and the sensor module 120, and/or a connection between a surface of the first dielectric layer 141 facing the display unit 130 and the display unit 130 may be a detachable connection.

As the connection between the first dielectric layer 141 and at least one of the sensing module 120 and the display unit 130 is set as a detachable connection, the sensing module 120 and the display unit 130 can be separated, so that during the test process, when any one of the sensing module 120 or the display unit 130 is damaged, the other can be recycled, thereby reducing the cost loss of the device.

In some embodiments, the first dielectric layer 141 is configured to be cured to realize a quasi-fixed connection between the sensing module 120 and the display unit 130 under a first preset treatment. The first dielectric layer 141 is further configured to realize separation of the sensing module 120 from the display unit 130 under a second preset treatment. The first dielectric layer being configured to realize separation of the sensing module from the display unit under a second preset treatment includes the first dielectric layer being configured to be separated from at least one of the sensing unit and the display unit under the second preset treatment. That is, after the first preset treatment, the first dielectric layer 141 may be cured to achieve the quasi-fixed connection between the sensing module 120 and the display unit 130, and after the second preset treatment, at least one of the connection between the first dielectric layer 141 and the sensing module 120 and the connection between the first dielectric layer 141 and the display unit 130 is separated. The first preset treatment includes at least one of temperature treatment, light treatment, and solvent treatment, and the second preset treatment includes at least one of temperature treatment, light treatment and solvent treatment.

The first preset treatment is suitable to cure the first dielectric layer 141 to realize the quasi-fixed connection between the sensing module 120 and the display module 130 for testing. The first dielectric layer 141 is a sticky material, so after the first dielectric layer 141 is cured, a relative position relationship between the sensing module 120 and the display unit 130 is fixed, so as to realize the quasi-fixed connection between the sensing module 120 and the display unit 130.

As the relative position relationship between the sensing module 120 and the display unit 130 is fixed, a distance between the sensing module 120 and the display unit 130 is basically constant, which can effectively improve the imaging reliability of the sensing module and the display effect of the display unit 130.

It should be noted that in some embodiments, the quasi-fixed connection between the sensing module 120 and the display unit 130 means that the sensing module 120 and the display unit 130 can be separated under certain conditions. For example, a strength of the connection between the sensing module 120 and the display unit 130 only needs to meet the requirements of the test process, and it does not need to be completely fixed. Specifically, a peeling force of the connection between the sensing module 120 and the display unit 130 is greater than a preset value, for example, the preset value may be 8 kg.

As the first dielectric layer 141 is filled between the sensing module 120 and the display unit 130, a peeling force of the connection between the sensing module 120 and the display unit 130 being greater than the preset value means that a peeling force of the connection between the sensing module 120 and the first dielectric layer 141 and a peeling force of the connection between the display unit 130 and the first dielectric layer 141 are both greater than the preset value.

In some embodiments, the first preset treatment is temperature treatment. The temperature treatment refers to setting the module structure under a certain temperature condition. The temperature treatment includes at least one of normal temperature treatment, low temperature treatment and high temperature treatment. Generally speaking, a temperature of low temperature treatment is below −40° C., a temperature of high temperature treatment is higher than 65° C. and lower than 150° C., and a temperature of normal temperature treatment is in a range of 0° C. to 30° C.

It should be noted that adopting temperature treatment as the first preset treatment is only one example. In other embodiments of the present disclosure, the first preset treatment may also be light treatment or solvent treatment, that is, the first preset treatment includes at least one of temperature treatment, light treatment and solvent treatment.

Specifically, in some embodiments of the present disclosure, the first preset treatment may be light treatment, that is, irradiating the first dielectric layer by light with a certain wavelength or intensity to realize the curing of the first dielectric layer, so as to fix the relative position between the sensing module and the display unit. In other embodiments of the present disclosure, the first preset treatment may also be solvent treatment, that is, the curing of the first dielectric layer may be realized by soaking in a certain solvent, and the solvent may have a preset concentration.

In addition, in some other embodiments of the present disclosure, the curing of the first dielectric layer can be realized by combining two or three of temperature treatment, light treatment and solvent treatment, such as the combination of temperature treatment and solvent treatment, that is, the first dielectric layer is soaked in the solvent at a specific temperature, or the combination of temperature treatment and light treatment, that is, the first dielectric layer receives the irradiation of a specific light at a certain temperature, or the combination of light treatment and solvent treatment, that is, the first dielectric layer is soaked in a specific solvent and receives the irradiation of a specific light.

The second preset treatment is suitable for detaching at least one of the connections between the display unit 130 and the first dielectric layer 141 and between the sensing module 120 and the first dielectric layer 141, so as to realize the separation between the display unit 130 and the sensing module 120, thereby realizing a high yield recovery of the display unit 130 and the sensing module 120, and resolving the decoupling problem between the display module 130 and the sensing module 120.

In some embodiments, after the second preset treatment, the strength of the connection between the first dielectric layer 141 and the sensing module 120 is greater than that between the first dielectric layer 141 and the display unit 130. As the price of the display unit 130 is relatively high, the strength between the first dielectric layer 141 and the display unit 130 is weaker after the second preset treatment, thus the first dielectric layer 141 and the display unit 130 can be separated more easily, so as to reduce the material residue on the display unit 130, which can effectively improve the recovery rate of the display unit 130, and improve the reuse rate of the display unit 130.

In some embodiments, the second preset treatment is solvent treatment. The solvent treatment refers to soaking the first dielectric layer 141 in a certain solvent with a preset concentration. In some embodiments, in the process of solvent soaking, the first dielectric layer 141 can be dissolved to realize the separation between the display unit 130 and the sensing module 120.

It should be noted that adopting solvent treatment as the second preset treatment is only one example. In other embodiments of present disclosure, the second preset treatment may also be temperature treatment or light treatment. The specific situation of the second preset treatment may refer to the first preset treatment, and the present disclosure will not repeat here.

In some embodiments, a material of the first dielectric layer 141 is at least one of solid adhesive or liquid adhesive. Specifically, the material of the first dielectric layer 141 may be at least one of solid adhesive such as OCA adhesive (optically clear adhesive), PSA adhesive (pressure sensitive adhesive), SCA adhesive (solid optically clear adhesive) or liquid adhesive such as pyrolytic UV (ultraviolet rays) adhesive.

It should be noted that the first preset treatment and the second preset treatment are adapted to the material of the first dielectric layer. For example, when the first dielectric layer is OCA adhesive, the first preset treatment is normal bonding process of OCA adhesive, that is, bonding under the normal bonding process of OCA adhesive, and the second preset treatment is ultraviolet illumination, that is, the viscosity of OCA adhesive can be reduced to realize the separation under ultraviolet illumination. When the first dielectric layer is PSA adhesive, the first preset treatment is to use normal bonding process of PSA adhesive to adhere and meet the requirements of peeling force, and the second preset treatment is to separate it from a side with the help of the external force of a tool. When the first dielectric layer is solid adhesive or water adhesive, the first preset treatment is to use normal bonding process of solid adhesive or water adhesive for bonding and curing, and the second preset treatment is to soak the solvent to dissolve the solid adhesive or water adhesive, that is, to achieve separation by soaking in a specific solvent. When the first dielectric layer is UV adhesive, the first preset treatment is normal bonding process of UV adhesive, that is, bonding under the normal bonding process of UV adhesive, and the second preset treatment is temperature treatment, that is, the viscosity of UV adhesive can be reduced to realize the separation at a certain temperature.

It should also be noted that the method of dissolving the first dielectric layer 141 by solvent to realize the second preset treatment can also clean and remove the first dielectric layer in the process of separating the display unit and the sensing module, so as to facilitate recycling of the device. Therefore, in the process of selecting the first dielectric layer, the material of the first dielectric layer needs to be easy to clean, so as to facilitate the recycling of the device.

In other embodiments of the present disclosure, when the second preset treatment does not realize the separation of the sensing module and the display unit by dissolving the first dielectric layer, the material of the first dielectric layer also needs to be easy to remove to facilitate the recycling of the device.

It should also be noted that in some embodiments, the sensing module is an optical fingerprint sensing module, and the first dielectric layer 141 also needs to have reliable optical properties, including stable optical parameters such as light transmittance and/or refractive index of the first dielectric layer 141. Specifically, the light transmittance of the first dielectric layer 141 is greater than a preset value, for example, the light transmittance of the first dielectric layer 141 is greater than 85%. The refractive index of the first dielectric layer 141 is close to a refractive index of the display unit 130 and the sensing module 120. The light transmittance of the first dielectric layer 141 will not decrease due to yellowing, and the refractive index of the first dielectric layer 141 will not change due to material degeneration, and there are no bubbles due to material aging, or the change of light transmittance, refractive index and material aging degree of the first dielectric layer 141 are within a preset range. The method of setting the optical performance parameters of the first dielectric layer 141 in a reasonable range can effectively reduce the influence on the performance of the sensing module, and is conducive to obtaining high-quality fingerprint images.

In addition, since the existence of bubbles will affect the light transmittance of the first dielectric layer 141 and change the light path, when the sensing module is an optical fingerprint sensing module, the material of the first dielectric layer 141 is a defoaming material, that is, the first dielectric layer 141 has no bubbles, so as to avoid the influence of bubbles on the light path.

Still referring to FIG. 1, the module structure further includes a second dielectric layer 142 disposed between the sensing module 120 and the bottom of the groove, and a third dielectric layer 143 disposed between the middle frame 110 and the display unit 130.

In some embodiments, the material of the second dielectric layer 142 is a deformable material, and as shown in FIG. 1, along a thickness direction Z of the module structure, that is, a direction perpendicular to a surface of the display unit 130, a side of the second dielectric layer 142 is in contact with the sensing module 120, and another side is in contact with the bottom of the groove. Therefore, at least part of the sensing module 120 is arranged in the groove with a hollow avoidance design, and adopting the second dielectric layer 142 of the deformable material can play a buffer role and reduce the risk of damage to the sensing module 120. Specifically, the material of the second dielectric layer 142 is double-sided foam adhesive, for example, a double-sided foam adhesive tape with a certain thickness and being stretchable.

The third dielectric layer 143 is suitable for realizing the connection between the display unit 130 and the middle frame 110 to form the housing of the module structure.

In some embodiments, the material of the third dielectric layer 143 is a deformable material to realize the buffering between the middle frame 110 and the display unit 130. The third dielectric layer 143 is sticky and easy to clean, so it is easy to separate the middle frame 110 from the display unit 130. The third dielectric layer 143 may be an opaque material. Specifically, the material of the third dielectric layer is double-sided foam adhesive, for example, a double-sided foam adhesive tape with a certain thickness and being stretchable.

It should be noted that in some embodiments, a thickness of the third dielectric layer 143 is less than that of the second dielectric layer 142, so as to avoid direct squeezing between the display unit 130 and the sensing module 120, and improve the reliability of the sensing module 120 and the display unit 130.

In addition, in some embodiments, the material of the third dielectric layer 143 is a good thermal conductor, so as to realize a heat dissipation function of the third dielectric layer 143 in the module structure, thereby improving the reliability and stability of the module structure.

It should be noted that in some embodiments, after the test process, the module structure needs to be strengthened to realize the complete fixation of the module structure, so as to improve the reliability and stability of the module structure under operation conditions, thus the first dielectric layer 141 is further configured to realize the fixed connection between the sensing module 120 and the display unit 130 under the strengthening treatment.

Specifically, the strengthening treatment is suitable for strengthening the strength of the connection between the sensing module 120 and the display unit 130, so as to change the quasi-fixed connection between the sensing module 120 and the display unit 130 into a complete fixed connection.

In some embodiments, the strengthening treatment is the same as the first preset treatment, that is, the strengthening treatment is temperature treatment. In other embodiments of the present disclosure, the strengthening treatment may also be different from the first preset treatment. The strengthening treatment may be at least one of temperature treatment, light treatment and solvent treatment.

It should be noted that in some embodiments, although the strengthening treatment is the same as the first preset treatment, that is, temperature treatment, specific process details are not exactly the same. Specifically, treatment time, treatment temperature and other specific details of the strengthening treatment are different from the first preset treatment. In some embodiments, the strengthening treatment adopts longer treatment time and higher treatment temperature to make the first dielectric layer to be irreversibly cured, so as to realize the fixed connection between the sensing module and the display unit.

In other embodiments of the present disclosure, when the first preset treatment is light treatment, the strengthening treatment may also be light treatment, but illumination intensity and illumination time of the light treatment are not the same as that of the first preset treatment. For example, in some embodiments, the illumination time of the first preset treatment is short (as short as a few seconds), and the illumination intensity is weak. The first dielectric layer after the first preset treatment makes the strength of the connection between the sensing module and the display unit 30-40% of that after the complete curing. However, the illumination time of the strengthening treatment is longer and the illumination intensity is stronger, so that the first dielectric layer is completely cured. The strengthening treatment can be carried out in a curing furnace. In some embodiments, the temperature of the curing furnace can be set at 50° C., and a light source used in the strengthening treatment needs to be replaced after working 2000 hours, so the strengthening treatment can be realized by combining the temperature treatment with the light treatment.

Figure 2:
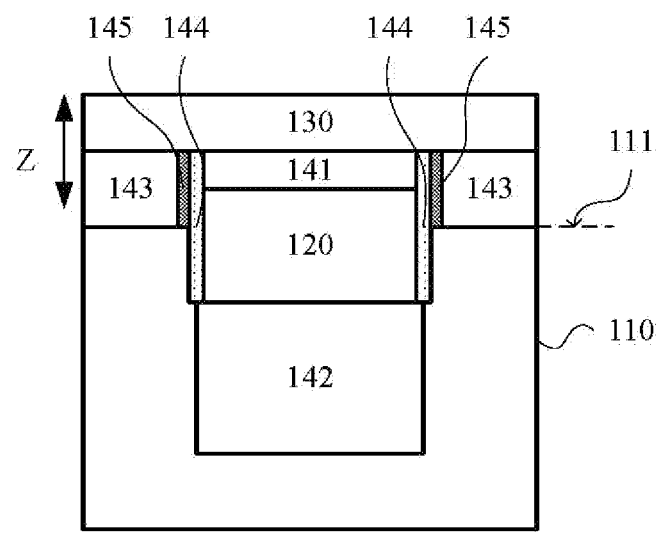
FIG. 2 is a schematic view showing a cross-sectional structure of a module structure according to a second embodiment of the present disclosure.

In some embodiments, the method of adopting strengthening treatment to completely cure the first dielectric layer is only one example. Referring to FIG. 2, a schematic view showing a cross-sectional structure of a module structure according to a second embodiment of the present disclosure is shown.

In the second embodiment, the module structure also includes a strengthening layer 144. The strengthening layer 144 is suitable for realizing the fixed connection between the display unit 130 and the sensing module 120, so as to ensure the reliability and stability of the module structure under operation conditions. The strengthening layer 144 is disposed on at least a part of the side wall of the sensing module 120 and extends to the display unit 130 to realize the fixed connection between the sensing module 120 and the display unit 130, that is, the strengthening layer 144 is disposed on the side walls of the sensing module 120 and the first dielectric layer 141.

Figure 3:
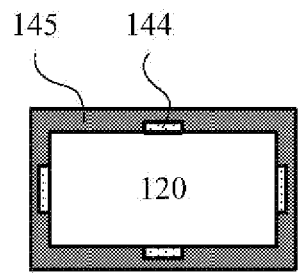
FIG. 3 is a cross-sectional view of the module structure along a plane parallel to an upper surface of a display unit in FIG. 2.

The sensing module 120 has an upper surface facing the display unit 130, a lower surface opposite to the upper surface, and a side wall perpendicular to the upper surface, where the side wall is disposed between the upper surface and the lower surface of the sensing module. Referring to FIG. 3, a cross-sectional view of the module structure along a plane parallel to an upper surface of a display unit in FIG. 2 is shown. In some embodiments, the strengthening layer 144 is disposed on a part of the side wall of the sensing module 120.

It should be noted that the third dielectric layer 143 is not shown in FIG. 3 for clarity.

In some embodiments, there are a plurality of strengthening layers 144 discretely distributed on the side wall of the sensing module 120. As shown in FIG. 3, in some embodiments, there are four strengthening layers 144, which are respectively disposed on the side walls of the sensing module 120 along four different planes.

Figure 4:
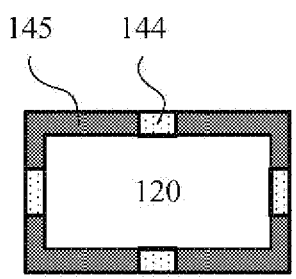
FIG. 4 is a cross-sectional view of a module structure along a plane parallel to an upper surface of a display unit according to a third embodiment of the present disclosure.

It should be noted that in some embodiments, the module structure also includes a light shielding layer 145 disposed around the side wall of the sensing module 120. The light shielding layer 145 can reflect or absorb stray light, so as to suppress interference signal and improve image quality. In some embodiments, along a circumferential direction of the side wall of the sensing module 120 parallel to the upper surface of the sensing module 120, the light shielding layer 145 covers a part of or all of a circumferential length of the side wall of the sensing module 120, and the light shielding layer 145 is disposed in the area of the side wall of the sensing module 120 which is not covered by the strengthening layer 144 (as shown in FIG. 4), or the light shielding layer 145 covers the side walls of the strengthening layer 144 and the sensing module 120 (as shown in FIG. 3). Therefore, in the second embodiment, after the test process, the module structure can form the strengthening layer 144 locally around the sensing module 120 by means of dispensing, so as to realize the complete fixed connection between the sensing module 120 and the display unit 130. Moreover, the light shielding layer 145 is formed around the sensing module 120 to reduce light leakage and improve image quality.

However, the method of forming the strengthening layer 144 by locally dispensing around the sensing module and realizing light shielding through the light shielding layer 145 is only one example. In other embodiments of the present disclosure, the strengthening layer may also be arranged around the periphery of the sensing module, and the strengthening layer may be formed by opaque materials.

Referring to FIG. 4, the third embodiment of the present disclosure differs from the second embodiment in that the light shielding layer 145 covers a part of the circumferential length of the side wall of the sensing module 120, and the light shielding layer 145 is disposed in an area of the side wall of the sensing module 120 which is not covered by the strengthening layer 144.

Figure 5:
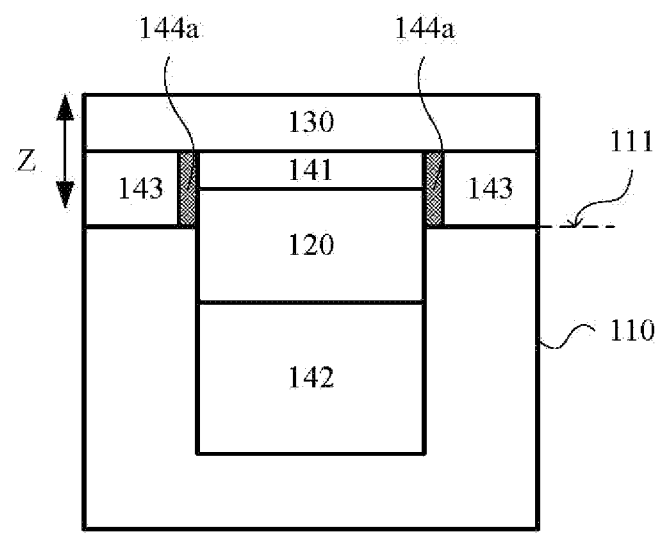
FIG. 5 is a schematic view showing a cross-sectional structure of a module structure according to a fourth embodiment of the present disclosure.
Figure 6:
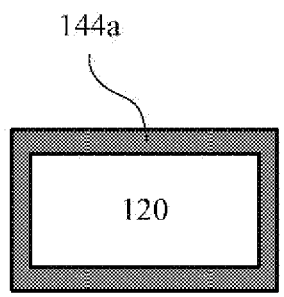
FIG. 6 is a cross-sectional view of the module structure along a plane parallel to an upper surface of a display unit in FIG. 5.

Referring to FIG. 5 and FIG. 6, FIG. 5 is a schematic view showing a cross-sectional structure of a module structure according to a fourth embodiment of the present disclosure, and FIG. 6 is a cross-sectional view of the module structure along a plane parallel to an upper surface of a display unit in FIG. 5. It should be noted that the third dielectric layer 143 is not shown in FIG. 6 for clarity.

The same features between the fourth embodiment and above embodiments of the present disclosure will not be repeated here. The difference between the fourth embodiment and the above embodiments is that in this embodiment, along the circumferential direction of the side wall of the sensing module 120 parallel to the upper surface of the sensing module 120, the strengthening layer 144a covers the circumferential length of the side wall of the sensing module 120, that is, the strengthening layer 144a extends one circle along the circumferential direction of the side wall of the sensing module 120.

In addition, in this embodiment, the material of the strengthening layer 144a is made of a light-absorbing material such as black adhesive, so the strengthening layer 144a itself has light absorption ability. Moreover, the strengthening layer 144a is arranged around the sensing module 120, which can also absorb stray light and improve image quality.

It should be noted that, as shown in FIG. 5, in the direction perpendicular to the surface of the display unit 130, the strengthening layer 144a is only disposed on part of the side wall of the sensing module 120, that is, the strengthening layer 144a does not completely cover the side wall of the sensing module 120. However, this arrangement is only an example. In other embodiments of the present disclosure, the strengthening layer can also completely cover the side wall of the sensing module in the direction perpendicular to the surface of the display unit.

In some embodiments, the quasi-fixed connection between the sensing module 120 and the display unit 130 is realized by curing the first dielectric layer 141. However, this is only an example. In other embodiments of the present disclosure, the first dielectric layer may not be cured. The module structure may be applied to both operation conditions and reliability test conditions. The quasi-fixed connection between the first dielectric layer 141 and the display unit 130 under the test conditions can solve the decoupling problem between the sensing module 120 and the display unit 130, and the fixed connection between the sensing module 120 and the display unit 130 under the operation conditions can improve the reliability and stability of the module structure.

Figure 7:
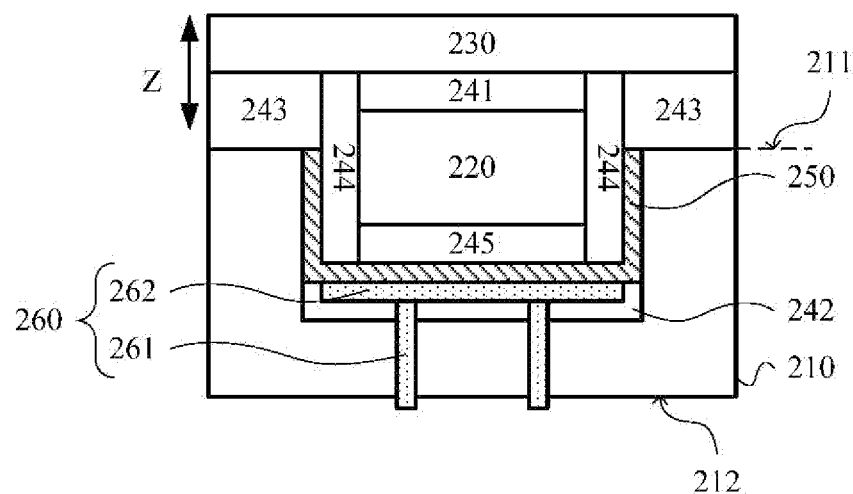
FIG. 7 is a schematic view showing a cross-sectional structure of a module structure according to a fifth embodiment of the present disclosure.

Referring to FIG. 7, a schematic view showing a cross-sectional structure of a module structure according to a fifth embodiment of the present disclosure is shown.

As shown in FIG. 7, a first dielectric layer 241 is filled between a sensing module 220 and a display unit 230, but the first dielectric layer 241 is a fluid. Therefore, in order to seal the first dielectric layer 241 between the sensing module 220 and the display unit 230, in this embodiment, the module structure also includes a fourth dielectric layer 244, a fixing support 250 and a fifth dielectric layer 245. The fourth dielectric layer 244 at least surrounds the sensing module 220, and the fourth dielectric layer 244 forms a cavity between the sensing module 220 and the display unit 230 to accommodate the first dielectric layer 241. The fixing support 250 is located between the sensing module 220 and the bottom of the groove, and the sensing module 220 is fixed on the fixing support 250. The fifth dielectric layer 245 is located between the fixing support 250 and the sensing module 220, and the fifth dielectric layer 245 is configured to realize the fixed connection between the sensing module 220 and the fixing support 250.

Since the first dielectric layer 241 is fluid, specifically, the first dielectric layer 241 is a low viscosity colloid or liquid material, it will not be cured even under the operation conditions and reliability test conditions. Thus, the display unit 230 and the sensing module 220 are always separated, so when any one of the display unit 230 and the sensing module 220 is damaged, the display unit 230 and the sensing module 220 can be separated to recycle another one, thereby effectively reducing the loss cost. A light transmittance of the first dielectric layer 241 is greater than a preset value, for example, the light transmittance of the first dielectric layer 241 is greater than 85%.

In some embodiments, a space between the sensing module 220 and the display unit 230 is filled by the first dielectric layer 241 of fluid material. The material of the first dielectric layer 241 may be an oily substance, and the viscosity coefficient of the material of the first dielectric layer is greater than or equal to a viscosity coefficient of silicone oil, for example, the first dielectric layer may be silicone oil.

The fourth dielectric layer 244 can play a sealing role for forming a closed space to accommodate the first dielectric layer 241 of fluid material. In addition, the fourth dielectric layer 244 cannot hinder the recycling after the separation of the sensing module 220 and the display unit 230, so the fourth dielectric layer 244 is a non-sticky and easy to clean material, so as to minimize the influence of the fourth dielectric layer 244 after the separation of the sensing module 220 and the display unit 230.

In addition, in some embodiments, the fourth dielectric layer 244 is made of a deformable material and configured to realize separation of the display unit 230 from the fixing support 250. The fourth dielectric layer 244 being configured to realize separation of the display unit 230 from the fixing support 250 includes: the fourth dielectric layer 244 being configured to be separated from at least one of the display unit 230 and the fixing support 250. In the direction perpendicular to the surface of the display unit 230, a side of the fourth dielectric layer contacts the display unit and another side contacts the fixing support. Therefore, the fourth dielectric layer 244 can also play a buffering role, so as to avoid the direct squeezing between the display unit 230 and the sensing module 220, and improve the stability and reliability of the display unit 230 and the sensing module 220. Specifically, the material of the fourth dielectric layer 244 is rubber.

Moreover, a third dielectric layer 243 between a middle frame 210 and the display unit 230 is a deformable material, and a second dielectric layer 242 is located between the fixing support 250 and the bottom of the groove. Along the thickness direction Z perpendicular to the surface of the display unit 230, a side of the second dielectric layer 242 contacts the bottom of the groove, and another side contacts the fixing support 250. The second dielectric layer 242 is made of a deformable material. Along the direction Z perpendicular to the surface of the display unit 230, the sum of a dimension of the fourth dielectric layer 244 and a dimension of the second dielectric layer 242 is larger than a dimension of the third dielectric layer 243. Specifically, the thickness of the fourth dielectric layer 244 and the thickness of the second dielectric layer 242 is larger than the thickness of the third dielectric layer 243. In some embodiments, the material of the third dielectric layer 243 is sticky and easy to clean, so it is easy to separate the middle frame 210 from the display unit 230. For example, the third dielectric layer 243 may be double-sided foam adhesive, for example, a double-sided foam adhesive tape with a certain thickness and being stretchable, and the material of the third dielectric layer 243 is a good thermal conductor, so as to realize the heat dissipation effect of the third dielectric layer 243 in the module structure, and improve the reliability and stability of the module structure.

It should be noted that in some embodiments, the second dielectric layer 242 between the fixing support 250 and the bottom of the groove can position and fix the fixing support 250 and the middle frame 210. Therefore, the second dielectric layer 242 is a sticky material. Specifically, the second dielectric layer 242 is made of double-sided foam adhesive, for example, a double-sided foam adhesive tape with a certain thickness and being stretchable.

The fixing support 250 is used to support the sensing module 220 to realize the fixation and positioning of the sensing module 220 and the middle frame 210. Specifically, in some embodiments, the fixing support 250 is in a "⊔" shape, and the sensing module 220 and the fourth dielectric layer 244 are located in the " ⊔ "-shaped groove. Specifically, the material of the fixing support 250 may be plastic, such as PET material.

The fifth dielectric layer 245 is used to fix the sensing module 220 on the fixing support 250. In some embodiments, the fifth dielectric layer 245 is located at the bottom of the groove of the " ⊔ "-shaped fixing support 250, and the sensing module 220 is located on the fifth dielectric layer 245.

In some embodiments, the fifth dielectric layer 245 is a deformable material to provide buffering effect and improve the stability and reliability of electronic components in the module structure. The fifth dielectric layer 245 is sticky. Specifically, the material of the fifth dielectric layer 245 is double-sided foam adhesive, for example, a double-sided foam adhesive tape with a certain thickness and being stretchable.

Still referring to FIG. 7, the middle frame 210 has a second surface 212 opposite to a first surface 211 (illustrated by a dashed line in the figure). The groove extends through a partial thickness of the middle frame 210. In some embodiments, the module structure also includes an adjusting member 260 configured for adjusting a distance between the fixing support 250 and the display unit 230.

A part of the adjusting member 260 extends through at least a partial of a remaining thickness of the middle frame 210, an end of the adjusting member 260 is exposed on the second surface 212 of the middle frame 210, and another end of the adjusting member 260 contacts the fixing support 250. A position of the fixing support 250 in the groove on the second surface 212 of the middle frame 210 can be adjusted via the end of the adjusting member exposed on the second surface 212 of the middle frame 210. In some embodiments, the part of the adjusting member 260 lies between the end of the adjusting member 260 exposed on the second surface 212 of the middle frame 210 and the another end of the adjusting member 260 contacting the fixing support 250.

The adjusting member 260 adjusts the distance between the fixing support 250 and the display unit 230 by adjusting the position of the fixing support 250 in the groove, and then adjusts the relative position between the sensing module 220 and the display unit 230, so as to eliminate the bubbles in the first dielectric layer 241, and improve the quality of the fingerprint image collected by the sensing module 220. In some embodiments, the adjusting member 260 is made of metal.

As shown in FIG. 7, in some embodiments, the adjusting member 260 includes an adjusting portion 261 and a fixing portion 262. One end of the fixing portion 262 is in contact with the fixing support, and the adjusting portion 261 penetrates through the remaining thickness of the middle frame 210. Along a direction of penetrating through the remaining thickness of the middle frame 210, one end of the adjusting portion 261 protrudes from the second surface 212 of the middle frame 210 and the other end of the adjusting portion 261 contacts the other end of the fixing portion 262.

The adjusting portion 261 is used for adjusting the position of the fixing support 250 in the groove of the middle frame. Specifically, the adjusting portion 261 penetrates the bottom of the groove of the middle frame 210, and one end of the adjusting portion 261 protrudes from the second surface 212 of the middle frame 210 along the direction of penetrating through the remaining thickness of the middle frame. Therefore, along the direction of penetrating through the remaining thickness of the middle frame, the greater the thickness of the adjusting part 261 extending into the groove, the farther the distance from the fixing support 250 to the bottom of the groove of the middle frame 210, the closer the distance from the sensing module 220 to the display module 230.

In some embodiments, there are a plurality of adjusting portions 261, and the thicknesses of the adjusting portions 261 extending into the grooves are different, which can adjust the direction of the sensing module 220 towards the surface of the display unit 230, eliminate the bubbles in the first dielectric layer 241, adjust the parallelism of planes between the sensing module 220 and the display unit 230, and improve the quality of display image and the quality of collected image of biometric features.

In some embodiments, along the direction of penetrating through the remaining thickness of the middle frame, the other end of the adjusting portion 261 contacts the fixing portion 262. The fixing portion 262 is used to realize the contact between the adjusting portion 261 and the fixing support 250, and convert a point contact between the adjusting portion 261 and the fixing support 250 into a surface contact, so as to disperse the pressure and improve force uniformity.

It should be noted that in some embodiments, the adjusting portion 261 contacts the fixing support 250 through the fixing part 262. In other embodiments of the present disclosure, the adjusting portion can also directly contact the fixing support.

In some embodiments, the middle frame 210 is made of metal. In other embodiments of the present disclosure, the material of the middle frame may also be hard plastic and other suitable materials.

In some embodiments, the display unit 230 is made of a rigid or hard or flexible material. In some embodiments, the display unit 230 is a rigid display unit, that is, the display unit has a rigid substrate. In particular, the substrate of the display unit is rigid glass. In other embodiments of the present disclosure, the substrate of the display unit may also be other rigid materials such as semiconductor substrate, for example, silicon, germanium and other semiconductor materials. In other embodiments of the present disclosure, the display unit may also be a flexible display unit, that is, the substrate of the display unit is a flexible material, such as a polyimide (PI) film, etc.

The module structure according to above embodiments may be applied to both the operation condition and the reliability test condition to solve the decoupling problem between the sensing module and the display unit.

Figure 8:
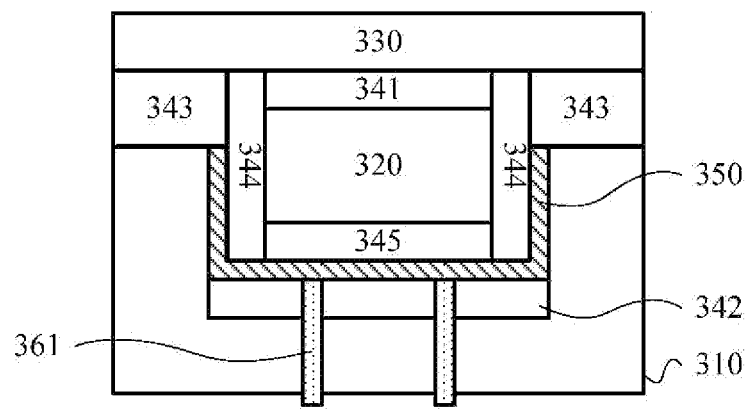
FIG. 8 is a schematic view showing a cross-sectional structure of a module structure according to a sixth embodiment of the present disclosure.

Referring to FIG. 8, a schematic view showing a cross-sectional structure of a module structure according to a sixth embodiment of the present disclosure is shown.

As shown in FIG. 8, the module structure includes a middle frame 310, a sensing module 320, a display unit 330, a first dielectric layer 341, a second dielectric layer 342, a third dielectric layer 343, a fourth dielectric layer 344, a fifth dielectric layer 345, a fixing support 350, and an adjusting member 361.

The same features between the present embodiment and above embodiments of the present disclosure are not described in detail. The difference between the present embodiment and the above embodiments is that in the present embodiment, the adjusting member only includes an adjusting member 361, and the other end of the adjusting member 361 is in direct contact with a fixing support 350 in the direction of penetrating the remaining thickness of a middle frame 310.

According to some embodiment, the module structure includes a middle frame, a sensing module, a display unit, a first dielectric layer filled between the sensing module and the display unit, a second dielectric layer disposed between the sensing module and a bottom of the groove, and a third dielectric layer disposed between the first surface of the middle frame and the display unit, thus a direct squeezing between the display unit and the sensing module due to their direct physical contact can be avoided, pressure between the display unit and the sensing module can be reduced, and a reliability of the sensing module and the display unit can be improved.

According to some embodiment, the first dielectric layer is detachably connected to at least one of the sensing module and the display unit. Therefore, in the test process, when any one of the sensing module and the display unit is damaged, the sensing module and the display unit can be separated to recycle the other one of the sensing module and the display unit that is not damaged, which effectively reduces the dependence of the sensing module on the display unit, and effectively reduces the cost loss of the module.

According to some embodiment, the first dielectric layer can be cured by a first preset treatment to achieve a quasi-fixed connection between the sensing module and the display unit, so that a relative position between the display unit and the sensing module is fixed, which can effectively ensure the quality of the fingerprint image captured by the sensing module and the displayed image of the display unit.

According to some embodiment, the first dielectric layer is also suitable for realizing a fixed connection between the sensing module and the display unit under the strengthening treatment, or the module structure further includes a strengthening layer for realizing the fixed connection between the sensing module and the display unit, thereby improving the reliability and stability of the module structure under operation conditions.

According to some embodiment, the sensing module is an optical fingerprint sensing module, and the connection between the first dielectric layer and the sensing module and the connection between the first dielectric layer and the display unit are all configured to be detachable, which can effectively reduce an internal stress of the module structure, and can effectively reduce the possibility of excessive stress which affects the functions of the sensing module and the display unit.

According to some embodiment, the second dielectric layer and the third dielectric layer are both made of deformable materials. When a side of the second dielectric layer is in contact with the sensing module, another side is in contact with the bottom of the groove. Moreover, a thickness of the second dielectric layer is greater than a thickness of the third dielectric layer, so as to ensure that a deformation range of the second dielectric layer is greater than a deformation range of the third dielectric layer, which can effectively avoid direct squeezing between the display unit and the sensing module due to their direct physical contact, reduce pressure between the display unit and the sensing module, and further improving the reliability of the sensing module and the display unit.

Although the present disclosure has been disclosed above, the present disclosure is not limited thereto. Any changes and modifications may be made by those skilled in the art without departing from the spirit and scope of the present disclosure, and the scope of the present disclosure should be determined by the appended claims.

The invention claimed is:

1. A module structure, comprising:
   a middle frame having a first surface, wherein a groove is disposed in the middle frame and has an opening on the first surface;
   a sensing module, wherein at least a partial of the sensing module is disposed in the groove;
   a display unit, disposed on the first surface of the middle frame and the sensing module;
   a first dielectric layer disposed between the sensing module and the display unit;
   a second dielectric layer disposed between the sensing module and a bottom of the groove; and
   a third dielectric layer disposed between the first surface of the middle frame and the display unit.

2. The module structure according to claim 1, wherein the sensing module and the display unit are detachably connected via the first dielectric layer.

3. The module structure according to claim 2, wherein the first dielectric layer is configured to realize a quasi-fixed connection between the sensing module and the display unit under a first preset treatment, and the first dielectric layer is further configured to realize separation of the sensing module from the display unit under a second preset treatment.

4. The module structure according to claim 3, wherein the first preset treatment comprises at least one of temperature treatment, light treatment and solvent treatment, and the second preset treatment comprises at least one of temperature treatment, light treatment, and solvent treatment.

5. The module structure according to claim 3, wherein the second preset treatment is configured to make a strength of a connection between the first dielectric layer and the sensing module greater than a strength of a connection between the first dielectric layer and the sensing module.

6. The module structure according to claim 3, wherein the first dielectric layer is made of a material comprising at least one of a solid adhesive and a liquid adhesive.

7. The module structure according to claim 3, wherein along a thickness direction of the module structure, a side of the second dielectric layer is in contact with the sensing module, and another side of the second dielectric layer is in contact with the bottom of the groove, and the second dielectric layer is made of a deformable material.

8. The module structure according to claim 7, wherein the third dielectric layer is made of a deformable material, and a thickness of the third dielectric layer is smaller than a thickness of the second dielectric layer.

9. The module structure according to claim 3, wherein the first dielectric layer is further configured to realize a fixed connection between the sensing module and the display unit under a strengthening treatment.

10. The module structure according to claim 9, wherein the strengthening treatment comprises at least one of temperature treatment, light treatment and solvent treatment.

11. The module structure according to claim 2, wherein the sensing module has an upper surface facing the display unit, a lower surface opposite to the upper surface and a side wall perpendicular to the upper surface, and the module structure further comprises a strengthening layer disposed on at least a part of the side wall of the sensing module and extending to the display unit to realize a fixed connection between the sensing module and the display unit.

12. The module structure according to claim 11, further comprising: a light shielding layer covering a part of or all of a circumferential length of the side wall of the sensing module along a circumferential direction of the side wall of the sensing module.

13. The module structure according to claim 11, wherein the strengthening layer covers a circumferential length of the side wall of the sensing module along a circumferential direction of the side wall of the sensing module.

14. The module structure according to claim 11, wherein the strengthening layer is made of a light-absorbing material.

15. The module structure according to claim 2, wherein the first dielectric layer is made of fluid, and the module structure further comprises:
- a fourth dielectric layer at least surrounding the sensing module, wherein the fourth dielectric layer forms a cavity between the sensing module and the display unit to accommodate the first dielectric layer;
- a fixing support disposed between the sensing module and the bottom of the groove, wherein the sensing module is fixed on the fixing support; and
- a fifth dielectric layer disposed between the fixing support and the sensing module, wherein the sensing module and the fixing support are fixedly connected via the fifth dielectric layer.

16. The module structure according to claim 15, wherein a viscosity coefficient of a material of the first dielectric layer is greater than or equal to a viscosity coefficient of silicone oil; or the first dielectric layer is made of silicone oil.

17. The module structure according to claim 15, wherein along a thickness direction of the module structure, a side of the fourth dielectric layer is in contact with the display unit and another side of the fourth dielectric layer is in contact with the fixing support, and the fourth dielectric layer is made of a deformable material and configured to realize separation of the display unit from the fixing support.

18. The module structure according to claim 15, wherein the third dielectric layer is made of a deformable material;
- wherein the second dielectric layer is disposed between the fixing support and the bottom of the groove, and in a thickness direction of the module structure, a side of the second dielectric layer is in contact with the bottom of the groove and another side of the second dielectric layer is in contact with the fixing support, and the second dielectric layer is a made of a deformable material; and
- wherein in the thickness direction of the module structure, a sum of a dimension of the fourth dielectric layer and a dimension of the second dielectric layer is larger than a dimension of the third dielectric layer.

19. The module structure according to claim 15, further comprising: an adjusting member configured for adjusting a distance between the fixing support and the display unit.

20. The module structure according to claim 19, wherein the middle frame has a second surface opposite to the first surface, and the groove penetrates through a partial thickness of the middle frame;
- wherein a part of the adjusting member penetrates through at least a partial of a remaining thickness of the middle frame, an end of the adjusting member is exposed on the second surface of the middle frame, and another end of the adjusting member contacts the fixing support; and
- wherein a position of the fixing support in the groove of the middle frame can be adjusted via the end of the adjusting member exposed on the second surface of the middle frame.

21. The module structure according to claim 15, wherein the fourth dielectric layer is made of rubber;
- the fifth dielectric layer is made of double-sided foam adhesive;
- the second dielectric layer is made of double-sided foam adhesive; and/or
- the third dielectric layer is made of an adhesive and easy-to-clean material.

22. The module structure according to claim 1, wherein the display unit and the middle frame are detachably connected via the third dielectric layer.

23. The module structure according to claim 1, wherein the sensing module is an optical fingerprint sensing module, and a light transmittance of a material of the first dielectric layer is greater than a preset value.

24. The module structure according to claim 23, wherein there are no bubbles in the first dielectric layer.

25. The module structure according to claim 1, wherein the display unit is made of a rigid or flexible material.

* * * * *